United States Patent
Streips et al.

(10) Patent No.: US 10,609,047 B2
(45) Date of Patent: Mar. 31, 2020

(54) NETWORK SECURITY TOOL

(71) Applicant: Bank of America Corporation, Charlotte, NC (US)

(72) Inventors: Marcus Adrian Streips, Concord, NC (US); Arjun Thimmareddy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 202 days.

(21) Appl. No.: 15/983,920

(22) Filed: May 18, 2018

(65) Prior Publication Data

US 2019/0356678 A1 Nov. 21, 2019

(51) Int. Cl.
*H04L 29/06* (2006.01)
*G06F 40/44* (2020.01)

(52) U.S. Cl.
CPC .......... *H04L 63/1416* (2013.01); *G06F 40/44* (2020.01); *G06F 2101/14* (2013.01); *H04L 63/145* (2013.01); *H04L 63/1483* (2013.01)

(58) Field of Classification Search
CPC ............. H04L 63/1416; H04L 63/1483; H04L 63/145; G06F 40/44; G06F 2101/14; G06F 21/56
See application file for complete search history.

(56) References Cited

U.S. PATENT DOCUMENTS

| | | | |
|---|---|---|---|
| 7,899,764 B2 | 3/2011 | Martin et al. | |
| 8,140,337 B2* | 3/2012 | Nakazawa | G06F 16/345 |
| | | | 704/257 |
| 8,874,553 B2 | 10/2014 | Lamba et al. | |
| 9,087,044 B2 | 7/2015 | Lamba et al. | |
| 9,135,240 B2 | 9/2015 | Gliozzo | |
| 9,858,261 B2 | 1/2018 | Fan et al. | |
| 2017/0300636 A1 | 10/2017 | Barker et al. | |
| 2018/0082205 A1* | 3/2018 | Watanabe | G06F 40/10 |
| 2018/0089152 A1* | 3/2018 | Maksak | G06F 40/117 |

* cited by examiner

*Primary Examiner* — Huan V Doan
(74) *Attorney, Agent, or Firm* — Michael A. Springs

(57) ABSTRACT

An apparatus includes a memory and a hardware processor. The memory stores a threshold. The processor receives first, second, and third messages. The processor determines a number of occurrences of words in the messages. The processor also calculates probabilities that a word in the messages is a particular word and co-occurrence probabilities. The processor further calculates probability distributions of words in the messages. The processor also calculates probabilities based on the probability distributions. The processor compares these probabilities to a threshold to determine whether the first message is related to the second message and/or whether the first message is related to the third message.

21 Claims, 3 Drawing Sheets

NETWORK SECURITY TOOL

TECHNICAL FIELD

This disclosure relates generally to network security.

BACKGROUND

Networks are used to communicate messages between devices. The security of the networks can be compromised when malicious users communicate over the network. Even well-intended users can compromise the security of the networks by performing unauthorized actions.

SUMMARY OF THE DISCLOSURE

Networks are used to communicate messages between devices. For example, many organizations include hundreds or even thousands of devices (e.g., personal computers, laptops, cell phones, IP phones, etc.) that use the network to communicate with one another and with devices outside the network.

The security of the networks can be compromised when malicious users communicate over the network. For example, malicious users can communicate phishing messages or messages that include viruses and/or worms. When these messages are treated inappropriately by other users on the network, the security of the network and the security of devices on the network is compromised.

Existing network implementations use various tools to automatically identify and block messages from malicious users. For example, these tools may scan incoming messages to identify trigger words within the messages that suggest the messages are from malicious users. These tools are often inaccurate resulting false negatives that compromise the security of the network. Additionally, these tools may discover trigger words in messages from well-intended users and classify those messages as malicious (e.g., false positive), which frustrates users.

Even well-intended users can compromise the security of the networks by performing unauthorized actions. For example, when users have access privileges that are incorrectly set, these users may accidentally access malicious websites or applications or perform functions that the user is not supposed to perform. These websites, applications, and functions can each compromise the security of the network and place other devices at risk.

Furthermore, existing security tools are not able to automatically set access privileges for users. Instead, an administrator typically reviews each user and sets access privileges for that user. When the administrator incorrectly sets an access privilege, the user may be given access to functions and sites that compromise the security of the network.

This disclosure contemplates an unconventional network security tool that improves network security over existing security tools. The unconventional tool scans messages to identify the probability distribution of words within these messages, including distributions for the co-occurrence of words across the messages. The tool then analyzes these probability distributions to determine whether the messages are related to other probability distributions. For example, the tool can identify messages as being malicious if these messages have probability distributions of words that are similar to probability distributions for malicious messages. As another example, the tool can automatically identify that a user should have certain access privileges if the probability distribution of words for the user's job description is similar to the probability distribution of words for descriptions of the access privileges. Three embodiments are described below.

According to an embodiment, an apparatus includes a memory and a hardware processor. The memory stores a threshold. The hardware processor receives a first message including a first word and a second word, a second message including a third word and a fourth word, and a third message including a fifth word and a sixth word. The processor determines a first number of occurrences of the first word in the first message, a second number of occurrences of the second word in the first message, a third number of occurrences of the third word in the second message, a fourth number of occurrences of the fourth word in the second message, a fifth number of occurrences of the fifth word in the third message, and a sixth number of occurrences of the sixth word in the third message. The processor also calculates a first probability that a word in the first message is the first word by dividing the first number of occurrences by a total number of words in the first message, a second probability that a word in the first message is the second word by dividing the second number of occurrences by the total number of words in the first message, a third probability that a word in the second message is the third word by dividing the third number of occurrences by a total number of words in the second message, a fourth probability that a word in the second message is the fourth word by dividing the fourth number of occurrences by the total number of words in the second message, a fifth probability that a word in the third message is the fifth word by dividing the fifth number of occurrences by a total number of words in the third message, a sixth probability that a word in the sixth message is the sixth word by dividing the sixth number of occurrences by the total number of words in the third message, a seventh probability that a word in the first message and a word in the second message are both the first word, an eighth probability that a word in the first message and a word in the second message are both the second word, a ninth probability that a word in the first message and a word in the third message are both the first word, and a tenth probability that a word in the first message and a word in the third message are both the second word. The processor further calculates a first probability distribution for the first message. The first probability distribution includes the first probability and the second probability. The processor also calculates a second probability distribution for the second message. The second probability distribution includes the third probability, the fourth probability, the seventh probability, and the eighth probability. The processor further calculates a third probability distribution for the third message. The third probability distribution includes the fifth probability, the sixth probability the ninth probability, and the tenth probability. The processor also calculates, based on the first probability distribution and the second probability distribution, an eleventh probability and, based on the first probability distribution and the third probability distribution, a twelfth probability. The processor further compares the eleventh probability to the threshold and the twelfth probability to the threshold. The processor further, based on the comparison of the eleventh probability to the threshold, identifies the second message as related to the first message and, based on the comparison of the twelfth probability to the threshold, identifies the third message as unrelated to the first message.

According to another embodiment, a method includes storing, by a memory, a threshold. The method also includes receiving, by a hardware processor communicatively coupled to the memory, a first message including a first word and a second word, a second message including a third word and a fourth word, and a third message including a fifth word and a sixth word. The method further includes determining, by the hardware processor, a first number of occurrences of the first word in the first message, a second number of occurrences of the second word in the first message, a third number of occurrences of the third word in the second message, a fourth number of occurrences of the fourth word in the second message, a fifth number of occurrences of the fifth word in the third message, and a sixth number of occurrences of the sixth word in the third message. The method further includes calculating, by the hardware processor, a first probability that a word in the first message is the first word by dividing the first number of occurrences by a total number of words in the first message, a second probability that a word in the first message is the second word by dividing the second number of occurrences by the total number of words in the first message, a third probability that a word in the second message is the third word by dividing the third number of occurrences by a total number of words in the second message, a fourth probability that a word in the second message is the fourth word by dividing the fourth number of occurrences by the total number of words in the second message, a fifth probability that a word in the third message is the fifth word by dividing the fifth number of occurrences by a total number of words in the third message, a sixth probability that a word in the sixth message is the sixth word by dividing the sixth number of occurrences by the total number of words in the third message, a seventh probability that a word in the first message and a word in the second message are both the first word, an eighth probability that a word in the first message and a word in the second message are both the second word, a ninth probability that a word in the first message and a word in the third message are both the first word, and a tenth probability that a word in the first message and a word in the third message are both the second word. The method also includes calculating, by the hardware processor, a first probability distribution for the first message. The first probability distribution includes the first probability and the second probability. The method further includes calculating, by the hardware processor, a second probability distribution for the second message. The second probability distribution includes the third probability, the fourth probability, the seventh probability, and the eighth probability. The method also includes calculating, by the hardware processor, a third probability distribution for the third message. The third probability distribution includes the fifth probability, the sixth probability, the ninth probability, and the tenth probability. The method further includes calculating, by the hardware processor, based on the first probability distribution and the second probability distribution, an eleventh probability and, based on the first probability distribution and the third probability distribution, a twelfth probability. The method also includes comparing, by the hardware processor, the eleventh probability to the threshold and the twelfth probability to the threshold. The method further includes, based on the comparison of the eleventh probability to the threshold, identifying, by the hardware processor, the second message as related to the first message and, based on the comparison of the twelfth probability to the threshold, identifying, by the hardware processor, the third message as unrelated to the first message.

According to yet another embodiment, a system includes a network and a network security tool. The network security tool stores a threshold, receives over the network a first message including a first word and a second word, a second message including a third word and a fourth word, and a third message including a fifth word and a sixth word. The network security tool also determines a first number of occurrences of the first word in the first message, a second number of occurrences of the second word in the first message, a third number of occurrences of the third word in the second message, a fourth number of occurrences of the fourth word in the second message, a fifth number of occurrences of the fifth word in the third message, and a sixth number of occurrences of the sixth word in the third message. The network security tool further calculates a first probability that a word in the first message is the first word by dividing the first number of occurrences by a total number of words in the first message, a second probability that a word in the first message is the second word by dividing the second number of occurrences by the total number of words in the first message, a third probability that a word in the second message is the third word by dividing the third number of occurrences by a total number of words in the second message, a fourth probability that a word in the second message is the fourth word by dividing the fourth number of occurrences by the total number of words in the second message, a fifth probability that a word in the third message is the fifth word by dividing the fifth number of occurrences by a total number of words in the third message, a sixth probability that a word in the sixth message is the sixth word by dividing the sixth number of occurrences by the total number of words in the third message, a seventh probability that a word in the first message and a word in the second message are both the first word, an eighth probability that a word in the first message and a word in the second message are both the second word, a ninth probability that a word in the first message and a word in the third message are both the first word, and a tenth probability that a word in the first message and a word in the third message are both the second word. The network security tool also calculates a first probability distribution for the first message. The first probability distribution includes the first probability and the second probability. The network security tool further calculates a second probability distribution for the second message. The second probability distribution includes the third probability, the fourth probability, the seventh probability, and the eighth probability. The network security tool also calculates a third probability distribution for the third message. The third probability distribution includes the fifth probability, the sixth probability the ninth probability, and the tenth probability. The network security tool calculates, based on the first probability distribution and the second probability distribution, an eleventh probability and based on the first probability distribution and the third probability distribution, a twelfth probability. The network security tool compares the eleventh probability to the threshold and the twelfth probability to the threshold. The network security tool also, based on the comparison of the eleventh probability to the threshold, identifies the second message as related to the first message and based on the comparison of the twelfth probability to the threshold, identifies the third message as unrelated to the first message.

Certain embodiments provide one or more technical advantages. For example, an embodiment improves the security of a network by automatically identifying messages as malicious based on the probability distribution of words in the message. As another example, an embodiment improves the security of a network by automatically identifying access privileges for a user based on the probability distribution of words in the user's job description. As another example, an embodiment does not require a taxonomy or concept map before determining similarity between concepts. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
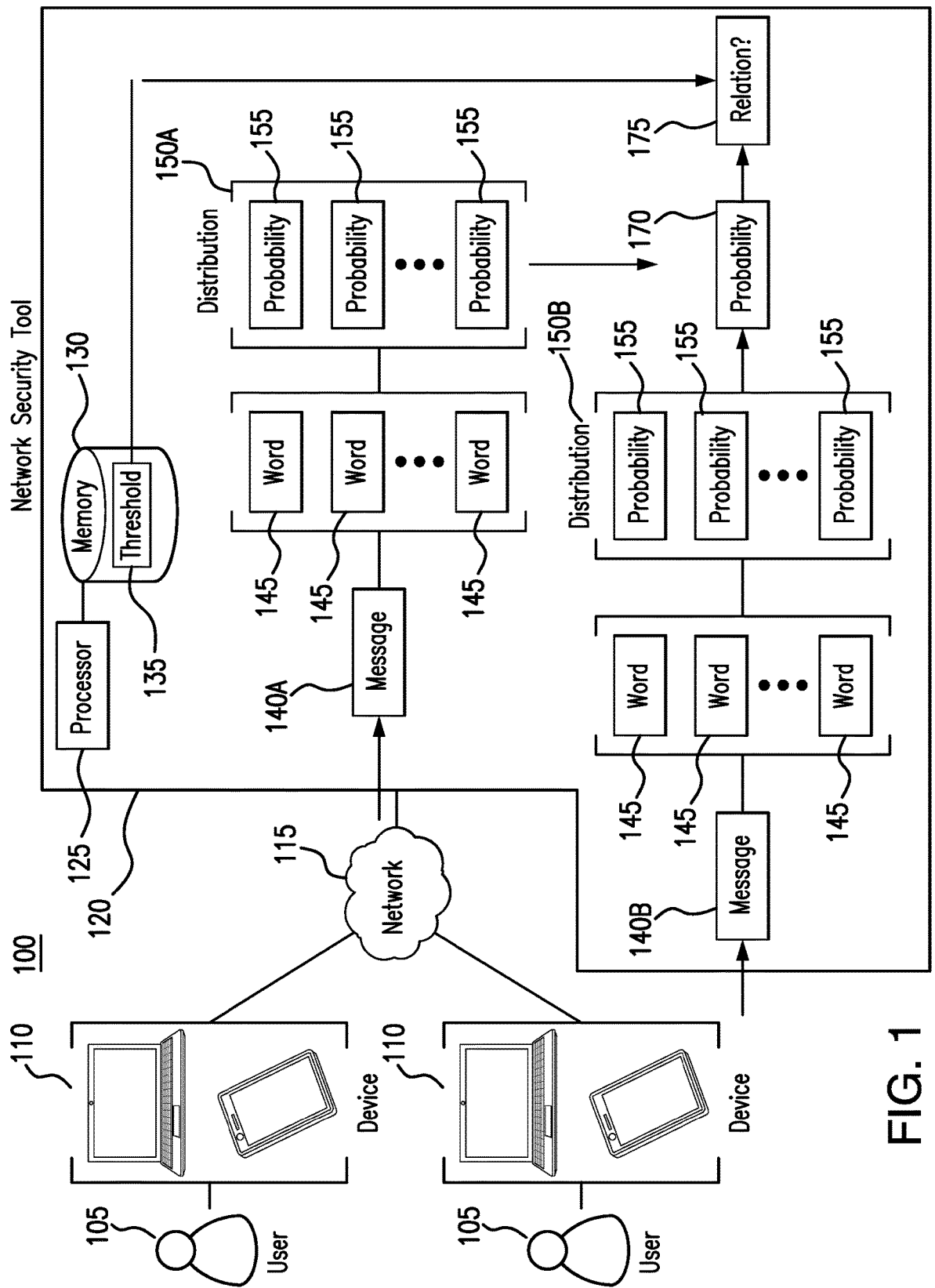
FIG. 1 illustrates an example network security system.
Figure 2:
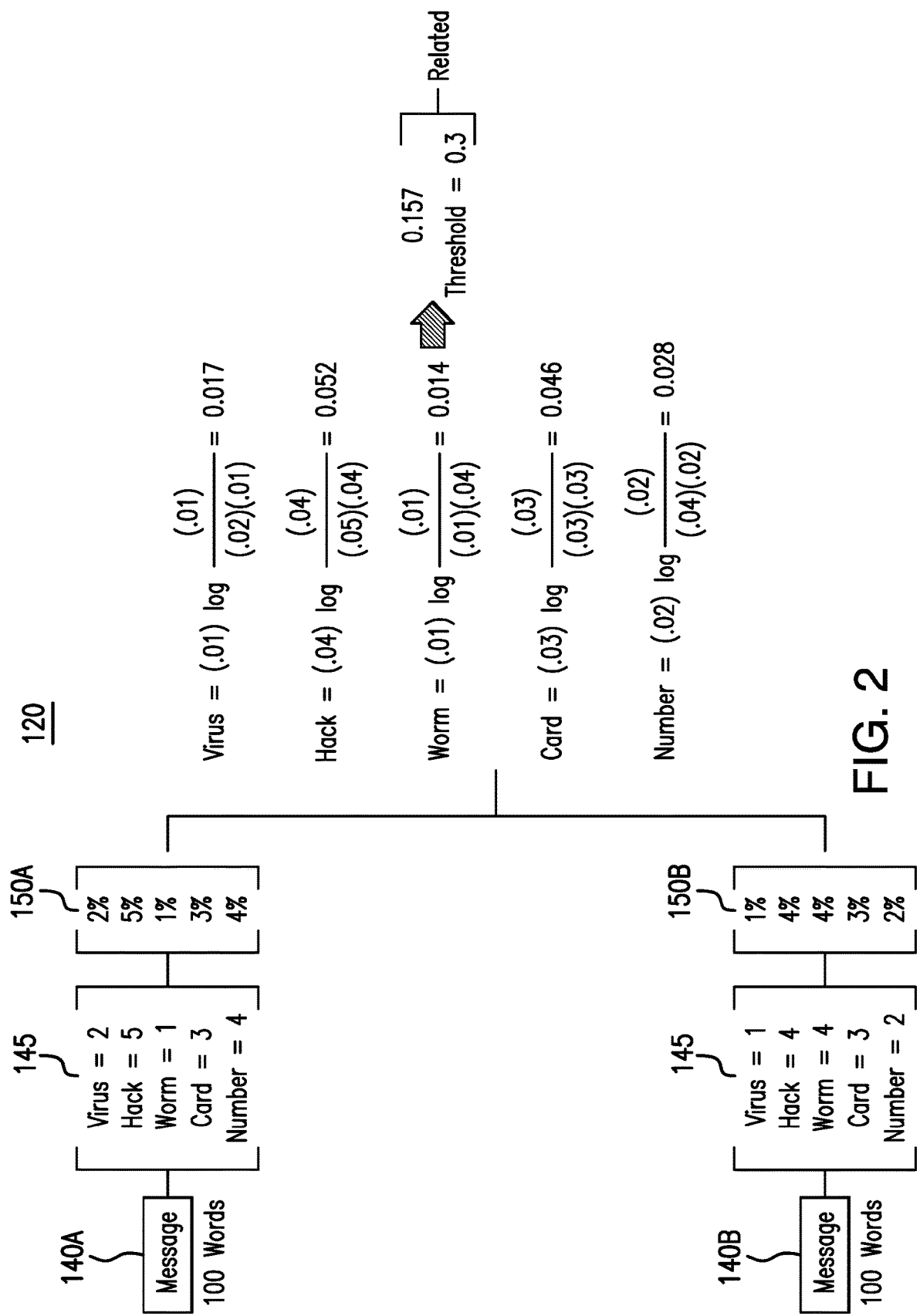
FIG. 2 illustrates an example network security tool of the system of FIG. 1.
Figure 3:
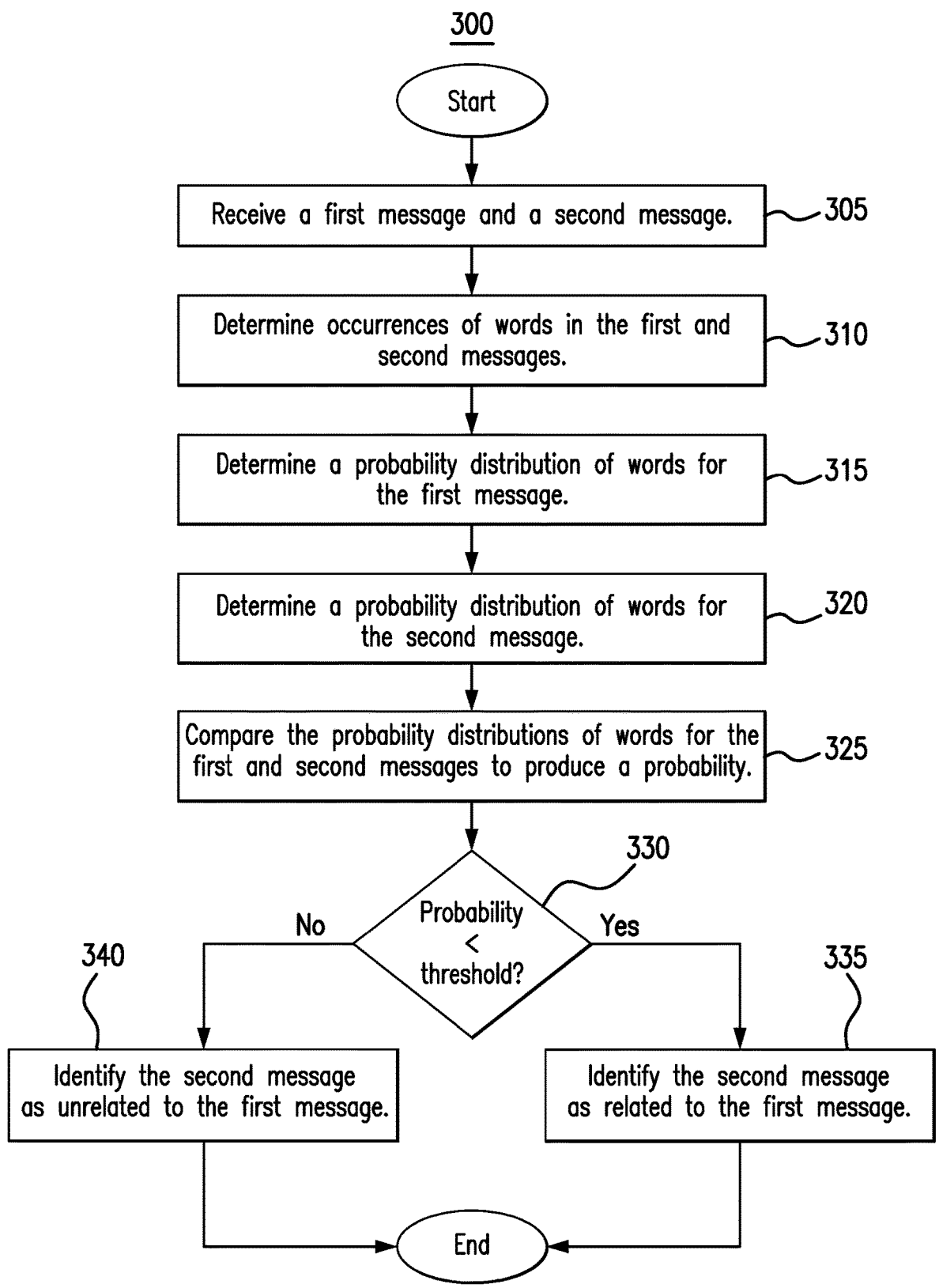
FIG. 3 is a flowchart illustrating a method for securing a network using the system of FIG. 1.

Embodiments of the present disclosure and its advantages are best understood by referring to FIGS. 1 through 3 of the drawings, like numerals being used for like and corresponding parts of the various drawings.

Networks are used to communicate messages between devices. For example, many organizations include hundreds or even thousands of devices (e.g., personal computers, laptops, cell phones, IP phones, etc.) that use the network to communicate with one another and with devices outside the network.

The security of the networks can be compromised when malicious users communicate over the network. For example, malicious users can communicate phishing messages or messages that include viruses and/or worms. When these messages are treated inappropriately by other users on the network, the security of the network and the security of devices on the network is compromised.

Existing network implementations use various tools to automatically identify and block messages from malicious users. For example, these tools may scan incoming messages to identify trigger words within the messages that suggest the messages are from malicious users. These tools are often inaccurate resulting false negatives that compromise the security of the network. Additionally, these tools may discover trigger words in messages from well-intended users and classify those messages as malicious (e.g., false positive), which frustrates users.

Even well-intended users can compromise the security of the networks by performing unauthorized actions. For example, when users have access privileges that are incorrectly set, these users may accidentally access malicious websites or applications or perform functions that the user is not supposed to perform. These websites, applications, and functions can each compromise the security of the network and place other devices at risk.

Furthermore, existing security tools are not able to automatically set access privileges for users. Instead, an administrator typically reviews each user and sets access privileges for that user. When the administrator incorrectly sets an access privilege, the user may be given access to functions and sites that compromise the security of the network.

This disclosure contemplates an unconventional network security tool that improves network security over existing security tools. The unconventional tool scans messages to identify the probability distribution of words within these messages, including distributions for the occurrence of a word in multiple messages. The tool then analyzes these probability distributions to determine whether the messages are related to other probability distributions. For example, the tool can identify messages as being malicious if these messages have probability distributions of words that are similar to probability distributions for malicious messages. As another example, the tool can automatically identify that a user should have certain access privileges if the probability distribution of words for the user's job description is similar to the probability distribution of words for descriptions of the access privileges. The network security tool along with example use cases will be described in more detail using FIGS. 1 through 3.

FIG. 1 illustrates an example network security system 100. As shown in FIG. 1, system 100 includes one or more devices 110, a network 115, and a network security tool 120. In particular embodiments, network security tool 120 improves network security by identifying whether certain messages or users are related to certain types of activity such as, for example, malicious or unintended activity.

Users 105 use one or more devices 110 to communicate over network 115. Devices 110 include any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The security of network 115 is important to its functioning. If the security of network 115 is compromised, then devices 110 may also be compromised and cease to operate appropriately. Additionally, when devices 110 are compromised, sensitive information may be accessed and/or stolen from devices 110. When malicious users communicate over network 115, these communications threaten the security of network 115 and the security of devices 110. It is thus important to identify these messages from malicious users and prevent them from affecting network 115 and/or devices 110.

In certain instances, users 105, though well-intended, also pose threats to the security of network 115. For example, users 105 may be incorrectly given access privileges. As a result, users 105 may access sites or perform functions over network 115 that threaten the security of network 115. It is thus important to assign the appropriate access privileges to users 105.

Network security tool 120 improves the security of network 115 by identifying messages that are related to the security of network 115. Generally, network security tool 120 compares the probability distribution of words in a message against probability distributions words in another message to determine if the two messages are related. Instead of comparing word counts, which may result in false positives or false negatives, network security tool 120 compares probability distributions that may yield more accurate results. As shown in FIG. 1, network security tool 120 includes a processor 125 and a memory 130. This disclosure contemplates processor 125 and memory 130 being configured to perform any of the functions of network security tool 120 described herein.

Processor 125 is any electronic circuitry, including, but not limited to microprocessors, application specific integrated circuits (ASIC), application specific instruction set processor (ASIP), and/or state machines, that communicatively couples to memory 130 and controls the operation of network security tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of network security tool 120 by processing information received from network 115, device(s) 110, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 130 to perform one or more of the functions described herein.

Network security tool 120 stores threshold 135. In particular embodiments, threshold 135 indicates a value at which a message is considered related or unrelated to the security of network 115. Network security tool 120 uses threshold 135 to evaluate the probability distribution of words in received messages. In certain embodiments, threshold 135 can be determined using simulation. For example, threshold 135 can be determined using a range of possible threshold values from a minimum to a maximum, at a set interval to help visualize the model accuracy versus threshold relationship. As another example, threshold 135 can be determined using non-linear optimization techniques. If labeling is not available, the threshold may be set at the median between the minimum and maximum threshold values. The threshold may be reset each time more information (e.g., labels) regarding the concepts are available. Threshold 135 can be determined without having to "retrain" the model because the concepts themselves have not changed. This means that this process of model optimization can be done quickly while eliminating the need for a separate analytics platform to update the model.

Setting the threshold 135 can be made more effective if certain preprocessing is performed to organize the data in topics or clusters. Setting a separate threshold for each topic/cluster group may result in better model performance as the model will be comparing concepts that are related. This process can also be done with concepts that are already organized in a taxonomy and being compared to new concepts. A separate threshold may be set for each group in the taxonomy. Certain embodiments allow the performance of network security tool 120 to be adjusted, tuned, and improved by merely adjusting threshold 135 (e.g., based on additional received information).

Network security tool 120 receives a messages 140A and 140B. Messages 140A and 140B may be any suitable type of messages. For example, message 140 may be an email message, a file, a document, a website, etc. Devices 110 may receive and/or send message 140. Network security tool 120 may intercept message 140 before message 140 reaches device 110. Network security tool 120 evaluates message 140A to determine whether message 140A is related to the security of network 115 by comparing the distribution of words in message 140A against the distribution of words in message 140B. For example, network security tool 120 can determine whether message 140A is a message communicated by a malicious user if message 140B is a message communicated by a malicious user. Additionally, network security tool 120 can determine whether message 140A relates to an access privilege that should or should not be granted to a user 105. Network security tool 120 uses the probability distribution of words in message 140A and the distribution of words in message 140B to make this determination.

Messages 140A and 140B include one or more words 145. These words 145 may form portions of statements, sentences, and/or phrases that appear in messages 140A and 140B. Some words 145 are related to the security of network 115. However, the mere appearance of these words 145 in message 140A may not indicate whether message 140A is actually related to the security of network 115. For example, if the word "virus" appears many times in message 140A, existing security tools may flag message 140A as being related to the security of network 115. However, message 140A may be an article containing several thousand words, so even if the word "virus" appears numerous times in message 140A, the word "virus" may not appear many times relative to the size of message 140A. Additionally, other words related to the security of network 115 may not appear very frequently in message 140A. Thus, even though message 140A is not related to the security of network 115, existing security tools may nevertheless flag message 140A as being related to the security of network 115, which may frustrate users 105.

Network security tool 120 identifies message 140A as being related to the security of network 115 based on the probability distribution of words 145 in message 140A and the distribution of words in message 140B. In this manner, network security tool 120 does not rely on mere word counts to determine whether message 140A is related to the security of network 115. In the illustrated example of FIG. 1, network security tool 120 determines a distribution 150A for message 140A and a distribution 150B for message 150B. Distribution 150A includes one or more probabilities 155. Each probability 155 indicates a probability that a particular word in message 140A is a word 145 or a probability that a word selected from message 140A matches a word selected from message 140B (e.g., co-occurrence). Using the previous example, probability 155 may indicate the probability that a word in message 140A is "virus." This probability 155 may be calculated by dividing the number of occurrences of the word "virus" in message 140A by the total number of words in message 140A. As another example, a probability 155 may indicate the probability that a word selected from message 140A matches a word selected from message 140B. Network security tool 120 may calculate these probabilities 155 for each word 145. Network security tool 120 may not calculate the probability 155 for every word in message 140A. It may be possible for network security tool 120 to calculate probabilities 155 for only a subset of the words 145 in message 140A. After the probabilities 155 are calculated, network security tool 120 assembles distribution 150A, which represents the probability distribution of words 145 in message 140A. Network security tool 120 can perform analogous calculations for message 140B to construct distribution 150B.

Network security tool 120 then compares distribution 150A with distribution 150B to determine how similar they are to each other. Network security tool 120 then produces a probability 170 that indicates the similarity between distribution 150 and distribution 160. In certain embodiments, network security tool 120 determines probability 170 by (1) selecting a word 145 from message 140A, (2) determining a first probability that a word selected from message 140A is the word 145, (3) determining a second probability that a word selected from message 140B is the word 145, (4) determining a third probability that a word selected from message 140A and a word selected from 140B are both the word 145 (e.g., co-occurrence), (5) dividing the third probability the product of the first probability and the second probability to produce a value, (6) multiplying the logarithm of the value by the third probability to produce the probability 170.

Network security tool 120 then compares probability 170 with threshold 135 to determine a relation 175. For example, network security tool 120 may compare probability 170 and threshold 135 to determine whether message 140A is related to message 140B and hence to the security of network 115. If probability 170 is less than threshold 135, network security tool 120 may determine that message 140A is related to message 140B. If probability 170 is greater than or greater than or equal to threshold 135, network security tool 120 may determine that message 140A is unrelated to message 140B. This disclosure contemplates network security tool 120 comparing probability 170 and threshold 135 in any manner, for example, network security tool 120 may determine that message 140A is related to message 140B if probability 170 is greater than or greater than or equal to threshold 135 and that message 140A is unrelated to message 140B is probability if probability 170 is less than threshold 135.

By identifying message 140 as being related to the security of network 115 or not related to the security of network 115, network security tool 120 may perform certain remedial actions. For example, network security tool 120 may determine that message 140A was likely communicated by a malicious user and quarantine message 140A. As another example, network security tool 120 may determine that message 140A describes a job of user 105 that requires a certain access privilege. As a result, network security tool 120 can automatically grant that access privilege to user 105. By identifying relation 175 based on the probability distribution 150 of words 145 in message 140A, network security tool 120 improves the security of network 115 and reduces the number of false positive and/or false negative identifications. Additionally, network security tool 120 does not require a taxonomy or concept map before determining similarity between messages.

FIG. 2 illustrates an example network security tool 120 of the system 100 of FIG. 1. As shown in FIG. 2, network security tool 120 analyzes the probability distribution of words in particular messages 140A and 140B to determine whether those messages 140 are related. It may be known that message 140B is sent by a malicious user, so a relationship between message 140A and 140B may indicate that message 140A is also sent by a malicious user. In particular embodiments, network security tool 120 improves the security of a network by reducing the number of false positives and/or false negatives associated with the identification of messages 140 that are related to the security of a network.

Network security tool receives message 140A. In the illustrated example of FIG. 2, message 140A includes 100 words. Network security tool 120 analyzes message 140A to determine the counts of particular words 145 in message 140A. Network security tool 120 determines that message 140A includes the word, "virus" two times, "hack" five times, "worm" one time, "card" three times and "number" four times. This disclosure contemplates network security tool 120 determining the occurrences of any number of words in message 140A. Network security tool 120 does not determine the number of occurrences of every word in message 140A in certain embodiments.

Network security tool 120 then determines a probability distribution 150A for the words 145 in message 140A. Network security tool 120 determines certain probabilities in distribution 150A by dividing the number of occurrences of each word 145 by the total number of words in message 140A. In the illustrated example of FIG. 2, networks security tool 120 determines that a word in message 140A has a 2% chance of being "virus," a 5% chance of being "hack," a 1% chance of being "worm," a 3% chance of being "card," and a 4% chance of being "number." Network security tool 120 can determine whether message 140A threatens the security of a network (e.g., if message 140A is sent by a malicious user) by comparing message 140A to message 140B, which may be sent by a malicious user.

Network security tool 120 receives a message 140B. Message 140B has 100 words. Network security tool 120 analyzes the words in message 140B and determines that the word "virus" appears one time, "hack" appears four times, "worm" appears four times, "card" appears three times, and "number" appears two times. Then, using these determined numbers, network security tool 120 determines a distribution 150B by dividing the determined number of occurrences of each word by the total number of words in message 140B. Network security tool 120 determines that a word in message 140B has a 1% chance of being "virus," a 4% chance of being "hack," a 4% chance of being "worm," a 3% chance of being "card," and a 2% chance of being "number." As discussed previously, this disclosure contemplates network security tool 120 analyzing the number of occurrences of any number of words in message 140B.

Network security tool 120 also determines co-occurrence probabilities for the words 145 in messages 140A and 140B. For example, network security tool 120 may determine that the probability that a word selected from message 140A and a word selected from message 140B are both "virus" is 1% (e.g., the minimum between 2% and 1%). Similarly, network security tool 120 may determine that the probability that a word selected from message 140A and a word selected from message 140B are both "hack" is 4% (e.g., the minimum between 5% and 4%). Network security tool 120 may continue this process to determine co-occurrence probabilities for each word. These co-occurrence probabilities are then added to distribution 150A and/or distribution 150B.

Network security tool 120 then compares distribution 150A and distribution 150B to determine if message 140A is related to message 140B. In the illustrated example of FIG. 2, network security tool 120 determines the similarity between the probabilities of distribution 150A and 150B. Specifically, network security tool 120 (1) divides the co-occurrence probability for a particular word by the probability that a word selected from message 140A is that particular word and by the probability that a word selected from message 140B is that particular word and (2) multiplies the logarithm of the result from step (1) with the co-occurrence probability for that particular word to produce a probability (labeled in FIG. 1 as probability 170). In the illustrated example of FIG. 2, network security tool 120 (1) divides the co-occurrence probability for "virus" (1%) by the probability that a word selected from message 140A is "virus" (2%) and by the probability that a word selected from message 140B is "virus" (1%) and (2) multiplies the logarithm of the result from step (1) with the co-occurrence probability for "virus" (1%) to produce a probability of 0.017. Network security tool 120 repeats this process for the other words of message 140A. Network security tool 120 then sums these resultant probabilities 170 for each word. As seen in FIG. 2, network security tool 120 adds these probabilities to arrive at a value of 0.157.

Network security tool 120 then compares the determined value with the threshold 135. In the illustrated example of FIG. 2, the threshold is set at 0.3. Network security tool 120 compares the value 0.157 to the threshold value 0.3 and determines that message 140A is related to message 140B because the determined value of 0.157 is less than the threshold value of 0.3. In response, network security tool 120 identifies message 140A as being related to message 140B and, therefore, a thread to the security of the network. This disclosure contemplates network security tool 120 setting threshold 135 as any suitable value. Additionally, this disclosure contemplates network security tool 120 determining that a message is related to the security of the network if the determined value is greater than the threshold value. In other words, network security tool 120 can be configured to determine whether a message is related to the security of a network based on any suitable comparison of the determined value and the threshold value.

After network security tool 120 determines whether certain messages are related to the security of the network. Network security tool 120 may take appropriate action. For example, if network security tool 120 determines that a message is likely sent by a malicious user, network security tool 120 may quarantine that message, block the user, and/or block the receiver of the message from connecting to the network. Using the example of FIG. 2, network security tool 120 may quarantine message 140A because it is determined to be related to message 140B, which could be a message that trains network security tool 120 to identify messages sent by malicious users. As another example, network security tool 120 can determine that message 140A is a job description of a user that should be granted a particular access privilege because message 140A is determined to be related to message 140B. Message 140B may be a message that trains network security tool 120 to identify a particular access privilege or job responsibility tied to a particular access privilege.

In particular embodiments, network security tool 120 smooths the data used to generate distributions 150A or 150B by adding non-zero constants to certain determined values. For example, network security tool 120 may add a non-zero constant to words with zero counts. In the example of FIG. 2, network security tool 120 may add a non-zero constant to the word "virus" as counted for message 140A if the word "virus" did not appear in message 140A. As a result, the word "virus" does not have a 0% probability in distribution 150A. Network security tool 120 instead calculates a non-zero probability for the word "virus" by dividing the non-zero constant by the total number of words in message 140A. In this manner, network security tool 120 yields a smoother data set for calculations.

In some embodiments, network security tool 120 weights certain words based on their importance to the relationship decision. For example, if network security tool 120 is attempting to determine whether a message is a message communicated by a malicious user, network security tool 120 may assign greater weights to the word "virus," "worm," and "card." When determining the probabilities for these words, network security tool may multiply the number of occurrences of these words by their corresponding weights, and then divide that number by the total number of words in the message. By giving these words additional weight, their importance to the determination of whether the message is communicated by a malicious user is emphasized. In certain embodiments these weights can be determined when network security tool 120 is trained. For example, words that tend to appear often across all messages may be assigned a lower weight that deemphasizes the importance of that word in the final determination. Common words such as "the" and "a" may be given no weight at all. Rarer words such as "virus" may be given greater weight. As a result, the weights may be inversely proportional to the number of messages in which their corresponding words appear.

In certain embodiments, network security tool 120 does not analyze the same words for each message. As a result, the vector of words 145 for each message may be different from each other. However, in certain instances, network security tool 120 analyzes vectors that have the same words 145 as shown in the example of FIG. 2.

FIG. 3 is a flow chart illustrating a method 300 for securing a network using the system 100 of FIG. 1. In particular embodiments, network security tool 120 performs method 300. By performing method 300, network security tool 120 improves the security of a network by reducing the number of false positives and/or false negatives when identifying whether messages are related to the security of the network.

Network security tool 120 begins by receiving a first message and a second message in step 305. The first message maybe used to train network security tool 120 to identify whether messages are related to the security of a network. In step 310, network security tool 120 determines occurrences of words in the first and second messages. Network security tool 120 may not determine the occurrences of every word in the first and second messages. Network security tool 120 may determine the occurrences of only a subset of the words in the first and second messages.

Network security tool 120 then determines a probability distribution of words for the first message in step 315. Network security tool 120 may determine certain probabilities in this probability distribution by dividing the determined number of occurrences of words in the first message by the total number of words in the first message. Additionally, network security tool 120 may determine co-occurrence probabilities for words in the first and second messages and add them to this distribution. In step 320, network security tool 120 determines a probability distribution of words for the second message. Network security tool 120 may determine certain probabilities in this probability distribution by dividing the determined number of occurrences of words in the second message by the total number of words in the second message. Additionally, network security tool 120 may determine co-occurrence probabilities for words in the first and second messages and add them to this distribution.

In step 325, network security tool 120 compares the probability distributions of words for the first and second messages to produce a probability. As shown in the example of FIG. 2, network security tool 120 may determine this probability by (1) dividing the co-occurrence probability for a particular word by the probability that a word selected from the first message is that particular word and by the probability that a word selected from the second message is that particular word and (2) multiplying the logarithm of the result from step (1) with the co-occurrence probability for that particular word. If the resulting probability is less than the threshold, network security tool 120 identifies the second message as related to the first message in step 335. If the probability is not less than the threshold, then network security tool 120 identifies the second message as unrelated to the first message in step 340. This disclosure contemplates network security tool 120 being configured to make these determinations if the determined probability is greater than the threshold in step 330 instead of being less than the threshold in step 330. In this manner, network security tool 120 reduces the number of false positives and false negatives. Additionally, network security tool 120 does not require a taxonomy or concept map before determining similarity between messages. In certain embodiments, network security tool 120 can be improved over time as administrators confirm the determination made by network security tool 120. The data can then be used to update the threshold using simulation and optimization techniques.

Modifications, additions, or omissions may be made to method 300 depicted in FIG. 3. Method 300 may include more, fewer, or other steps. For example, steps may be performed in parallel or in any suitable order. While discussed as network security tool 120 (or components thereof) performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a threshold;
a hardware processor communicatively coupled to the memory, the hardware processor configured to:
  receive a first message comprising a first word and a second word;
  receive a second message comprising a third word and a fourth word;
  receive a third message comprising a fifth word and a sixth word;
  determine a first number of occurrences of the first word in the first message;
  determine a second number of occurrences of the second word in the first message;
  determine a third number of occurrences of the third word in the second message;
  determine a fourth number of occurrences of the fourth word in the second message;
  determine a fifth number of occurrences of the fifth word in the third message;
  determine a sixth number of occurrences of the sixth word in the third message;
  calculate a first probability that a word in the first message is the first word by dividing the first number of occurrences by a total number of words in the first message;
  calculate a second probability that a word in the first message is the second word by dividing the second number of occurrences by the total number of words in the first message;
  calculate a third probability that a word in the second message is the third word by dividing the third number of occurrences by a total number of words in the second message;
  calculate a fourth probability that a word in the second message is the fourth word by dividing the fourth number of occurrences by the total number of words in the second message;
  calculate a fifth probability that a word in the third message is the fifth word by dividing the fifth number of occurrences by a total number of words in the third message;
  calculate a sixth probability that a word in the third message is the sixth word by dividing the sixth number of occurrences by the total number of words in the third message;
  calculate a seventh probability that a word in the first message and a word in the second message are both the first word;
  calculate an eighth probability that a word in the first message and a word in the second message are both the second word;
  calculate a ninth probability that a word in the first message and a word in the third message are both the first word;
  calculate a tenth probability that a word in the first message and a word in the third message are both the second word;
  calculate a first probability distribution for the first message, the first probability distribution comprising the first probability and the second probability;
  calculate a second probability distribution for the second message, the second probability distribution comprising the third probability, the fourth probability, the seventh probability, and the eighth probability;

calculate a third probability distribution for the third message, the third probability distribution comprising the fifth probability, the sixth probability, the ninth probability, and the tenth probability;

calculate, based on the first probability distribution and the second probability distribution, an eleventh probability;

calculate, based on the first probability distribution and the third probability distribution, a twelfth probability;

compare the eleventh probability to the threshold;

compare the twelfth probability to the threshold;

based on the comparison of the eleventh probability to the threshold, identify the second message as related to the first message; and based on the comparison of the twelfth probability to the threshold, identify the third message as unrelated to the first message.

2. The apparatus of claim 1, wherein the processor is further configured to:

determine a seventh number of occurrences of a seventh word in the first message;

add a non-zero constant to the seventh number to produce an eighth number of occurrences; and calculate a thirteenth probability that a word in the first message is the seventh word by dividing the eighth number of occurrences by the total number of words in the first message.

3. The apparatus of claim 1, wherein calculating the first probability distribution comprises:

multiplying the first probability by a first weight; and multiplying the second probability by a second weight.

4. The apparatus of claim 3, wherein the first weight is inversely proportional to a number of messages in which the first word appears.

5. The apparatus of claim 1, wherein the processor is further configured to quarantine the second message in response to identifying the second message as related to the first message.

6. The apparatus of claim 1, wherein calculating the seventh probability comprises:

multiplying the first probability with the third probability to produce a first product;

multiplying the second probability with the fourth probability to produce a second product; and adding the first product and the second product.

7. The apparatus of claim 1, wherein the first, third, and fifth words are the same word.

8. A method comprising:

storing, by a memory, a threshold;

receiving, by a hardware processor communicatively coupled to the memory, a first message comprising a first word and a second word;

receiving, by the hardware processor, a second message comprising a third word and a fourth word;

receiving, by the hardware processor, a third message comprising a fifth word and a sixth word;

determining, by the hardware processor, a first number of occurrences of the first word in the first message;

determining, by the hardware processor, a second number of occurrences of the second word in the first message;

determining, by the hardware processor, a third number of occurrences of the third word in the second message;

determining, by the hardware processor, a fourth number of occurrences of the fourth word in the second message;

determining, by the hardware processor, a fifth number of occurrences of the fifth word in the third message;

determining, by the hardware processor, a sixth number of occurrences of the sixth word in the third message;

calculating, by the hardware processor, a first probability that a word in the first message is the first word by dividing the first number of occurrences by a total number of words in the first message;

calculating, by the hardware processor, a second probability that a word in the first message is the second word by dividing the second number of occurrences by the total number of words in the first message;

calculating, by the hardware processor, a third probability that a word in the second message is the third word by dividing the third number of occurrences by a total number of words in the second message;

calculating, by the hardware processor, a fourth probability that a word in the second message is the fourth word by dividing the fourth number of occurrences by the total number of words in the second message;

calculating, by the hardware processor, a fifth probability that a word in the third message is the fifth word by dividing the fifth number of occurrences by a total number of words in the third message;

calculating, by the hardware processor, a sixth probability that a word in the sixth message is the sixth word by dividing the sixth number of occurrences by the total number of words in the third message;

calculating, by the hardware processor, a seventh probability that a word in the first message and a word in the second message are both the first word;

calculating, by the hardware processor, an eighth probability that a word in the first message and a word in the second message are both the second word;

calculating, by the hardware processor a ninth probability that a word in the first message and a word in the third message are both the first word;

calculating, by the hardware processor, a tenth probability that a word in the first message and a word in the third message are both the second word;

calculating, by the hardware processor, a first probability distribution for the first message, the first probability distribution comprising the first probability and the second probability;

calculating, by the hardware processor, a second probability distribution for the second message, the second probability distribution comprising the third probability, the fourth probability, the seventh probability, and the eighth probability;

calculating, by the hardware processor, a third probability distribution for the third message, the third probability distribution comprising the fifth probability, the sixth probability, the ninth probability, and the tenth probability;

calculating, by the hardware processor, based on the first probability distribution and the second probability distribution, an eleventh probability;

calculating, by the hardware processor, based on the first probability distribution and the third probability distribution, a twelfth probability;

comparing, by the hardware processor, the eleventh probability to the threshold;

comparing, by the hardware processor, the twelfth probability to the threshold;

based on the comparison of the eleventh probability to the threshold, identifying, by the hardware processor, the second message as related to the first message; and based on the comparison of the twelfth probability to the threshold, identifying, by the hardware processor, the third message as unrelated to the first message.

9. The method of claim 8, further comprising:

determining a seventh number of occurrences of a seventh word in the first message;

adding a non-zero constant to the seventh number to produce an eighth number of occurrences; and calculating a thirteenth probability that a word in the first message is the seventh word by dividing the eighth number of occurrences by the total number of words in the first message.

10. The method of claim 8, wherein calculating the first probability distribution comprises:

multiplying the first probability by a first weight; and multiplying the second probability by a second weight.

11. The method of claim 10, wherein the first weight is inversely proportional to a number of messages in which the first word appears.

12. The method of claim 8, further comprising quarantining the second message in response to identifying the second message as related to the first message.

13. The method of claim 8, wherein calculating the seventh probability comprises:

multiplying the first probability with the third probability to produce a first product;

multiplying the second probability with the fourth probability to produce a second product; and adding the first product and the second product.

14. The method of claim 8, wherein the first, third, and fifth words are the same word.

15. A system comprising:

a network; and a network security tool communicatively coupled to the network, the network security tool comprising a memory and a hardware processor configured to:

store a threshold;

receive a first message over the network, the first message comprising a first word and a second word;

receive a second message over the network, the second message comprising a third word and a fourth word;

receive a third message over the network, the third message comprising a fifth word and a sixth word;

determine a first number of occurrences of the first word in the first message;

determine a second number of occurrences of the second word in the first message;

determine a third number of occurrences of the third word in the second message;

determine a fourth number of occurrences of the fourth word in the second message;

determine a fifth number of occurrences of the fifth word in the third message;

determine a sixth number of occurrences of the sixth word in the third message;

calculate a first probability that a word in the first message is the first word by dividing the first number of occurrences by a total number of words in the first message;

calculate a second probability that a word in the first message is the second word by dividing the second number of occurrences by the total number of words in the first message;

calculate a third probability that a word in the second message is the third word by dividing the third number of occurrences by a total number of words in the second message;

calculate a fourth probability that a word in the second message is the fourth word by dividing the fourth number of occurrences by the total number of words in the second message;

calculate a fifth probability that a word in the third message is the fifth word by dividing the fifth number of occurrences by a total number of words in the third message;

calculate a sixth probability that a word in the sixth message is the sixth word by dividing the sixth number of occurrences by the total number of words in the third message;

calculate a seventh probability that a word in the first message and a word in the second message are both the first word;

calculate an eighth probability that a word in the first message and a word in the second message are both the second word;

calculate a ninth probability that a word in the first message and a word in the third message are both the first word;

calculate a tenth probability that a word in the first message and a word in the third message are both the second word;

calculate a first probability distribution for the first message, the first probability distribution comprising the first probability and the second probability;

calculate a second probability distribution for the second message, the second probability distribution comprising the third probability, the fourth probability, the seventh probability, and the eighth probability;

calculate a third probability distribution for the third message, the third probability distribution comprising the fifth probability, the sixth probability, the ninth probability, and the tenth probability;

calculate, based on the first probability distribution, the second probability distribution, an eleventh probability;

calculate, based on the first probability distribution and the third probability distribution, a twelfth probability;

compare the eleventh probability to the threshold;

compare the twelfth probability to the threshold;

based on the comparison of the eleventh probability to the threshold, identify the second message as related to the first message; and based on the comparison of the twelfth probability to the threshold, identify the third message as unrelated to the first message.

16. The system of claim 15, wherein the network security tool is further configured to:

determine a seventh number of occurrences of a seventh word in the first message;

add a non-zero constant to the seventh number to produce an eighth number of occurrences; and calculate a thirteenth probability that a word in the first message is the seventh word by dividing the eighth number of occurrences by the total number of words in the first message.

17. The system of claim 15, wherein calculating the first probability distribution comprises:
multiplying the first probability by a first weight; and
multiplying the second probability by a second weight.

18. The system of claim 17, wherein the first weight is inversely proportional to a number of messages in which the first word appears.

19. The system of claim 15, wherein the processor is further configured to quarantine the second message in response to identifying the second message as related to the first message.

20. The system of claim 15, wherein calculating the seventh probability comprises:
multiplying the first probability with the third probability to produce a first product;
multiplying the second probability with the fourth probability to produce a second product; and
adding the first product and the second product.

21. The system of claim 15, wherein the first, third, and fifth words are the same word.

* * * * *